United States Patent
Zurke

[19]

[11] Patent Number: 5,853,162
[45] Date of Patent: Dec. 29, 1998

[54] ELECTROMAGNETIC CONTROL VALVE RESPONSIVE TO POSITIVE AND NEGATIVE PRESSURES

[75] Inventor: Janusz Zurke, Wuppertal, Germany

[73] Assignee: Pierburg Aktiegesellschaft, Neuss, Germany

[21] Appl. No.: 852,267

[22] Filed: May 6, 1997

[30] Foreign Application Priority Data

May 11, 1996 [DE] Germany .................. 196 19 196.3

[51] Int. Cl.⁶ ................................................ F16K 31/02
[52] U.S. Cl. .............. 251/129.19; 137/526; 137/533.17; 137/493.8; 137/493.7
[58] Field of Search ........................ 251/129.19, 82, 251/83; 137/526, 533.19, 493.8, 533.13, 493.7

[56] References Cited

U.S. PATENT DOCUMENTS

| | | | |
|---|---|---|---|
| 1,423,679 | 7/1922 | Pavitchich | 137/533.19 |
| 3,473,780 | 10/1969 | Harms | 251/129.19 |
| 3,800,793 | 4/1974 | Marrese et al. | 137/526 |
| 4,379,470 | 4/1983 | Reutter | 137/493.8 |
| 4,674,529 | 6/1987 | Ferguson | 437/533.13 |
| 5,048,560 | 9/1991 | Jannotta et al. | 137/493.8 |

FOREIGN PATENT DOCUMENTS 4140255  9/1993  Germany .
4430723  7/1996  Germany .

*Primary Examiner*—Denise L. Ferensic
*Assistant Examiner*—John Ball
*Attorney, Agent, or Firm*—Ladas & Parry

[57] ABSTRACT

An electromagnetic control valve having a coil housing and a valve housing provided with a connector for inlet into the valve housing of a medium whose pressure is to be controlled. The valve housing has a chamber connected to ambient atmosphere and a pressure valve controlling communication between the chamber and the medium introduced into the valve housing. A by-pass channel is connected to ambient atmosphere, and a suction valve controls communication between the by-pass channel and the medium introduced into the valve housing. The pressure valve comprises a valve plate facing a valve seat in the valve housing for selectively opening and closing an opening in the valve seat to respectively connect and disconnect the medium introduced into the valve housing from the chamber. The valve plate is slidably supported by a basket and is biassed by a spring against stops provided on the basket. An electromagnet in the coil housing acts to displace the basket when the electro-magnet is energized to apply the valve plate against the valve seat and cause the valve plate to be lifted off the stops. A predetermined pressure difference for the opening of the pressure and suction valves can be established within close tolerances.

9 Claims, 1 Drawing Sheet

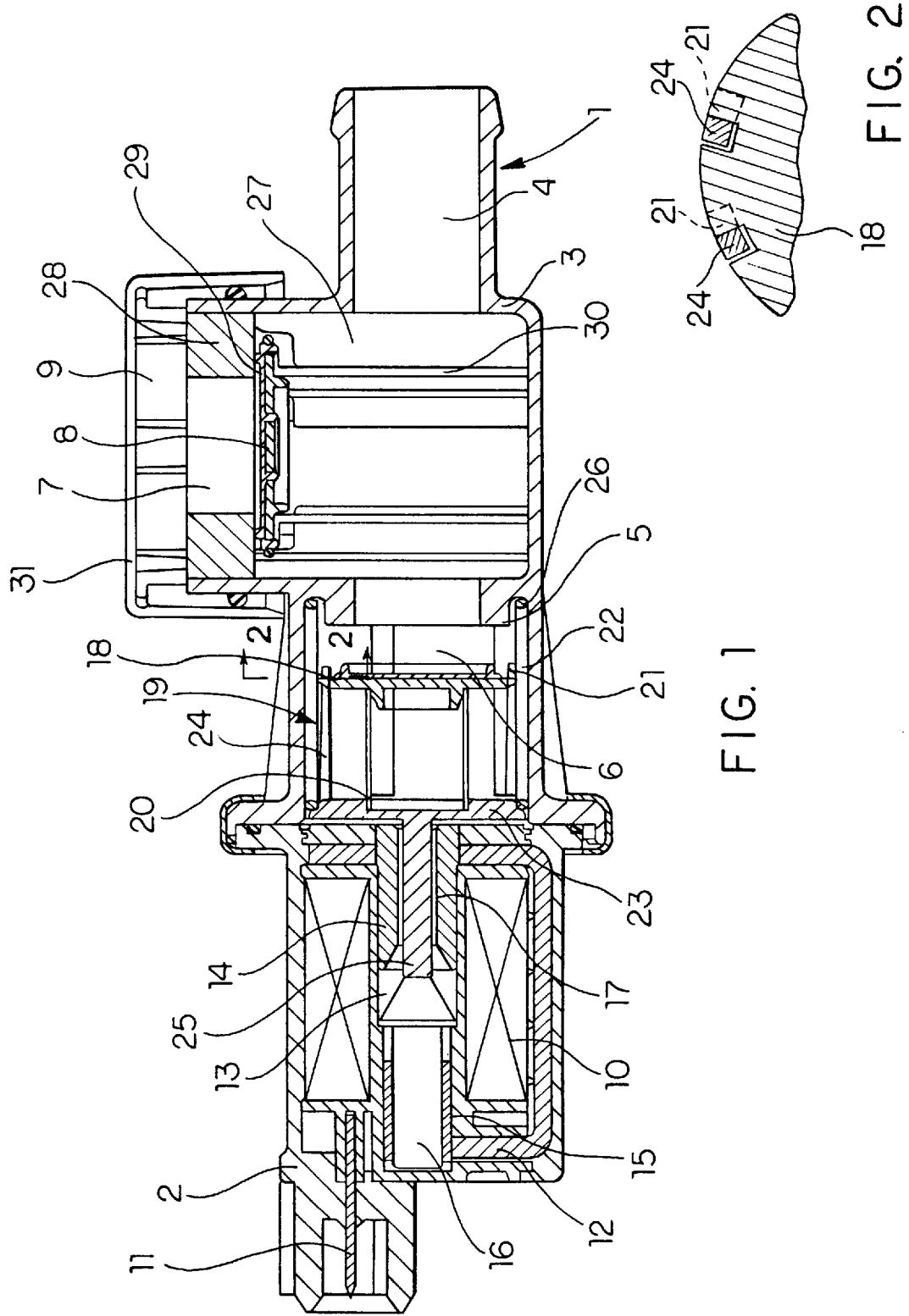

ELECTROMAGNETIC CONTROL VALVE RESPONSIVE TO POSITIVE AND NEGATIVE PRESSURES

The invention relates to an electromagnetic control valve, particularly for use with an internal combustion engine to vent the fuel tank thereof.

The invention relates particularly to an electromagnetic control valve having a coil housing for a coil and armature and a valve housing for receiving the medium to be controlled and containing a pressure relief valve and a suction relief valve.

BACKGROUND AND PRIOR ART

Electromagnetic control valves are utilized for various switching functions in internal combustion engines. By way of example, a control valve is disclosed in DE 41 40 255 in a venting device for a fuel tank of an internal combustion engine to control connection of a vent line to the atmosphere. The vent line is selectively opened and closed in response to pre-determined suction and over pressure in the unit in order to control its functional operation.

In this control valve, the vent line is normally closed and when the pressure of the medium under control exceeds a pre-determined positive pressure, the pressure is sufficient to open the valve and thus relieve the pressure.

This operation is achieved by a magnetic circuit which displaces the valve member of the control valve to its closed position with a force which is just in excess of the desired predetermined positive pressure to be relieved. The magnetic force which acts on the valve member is a function of the electro-magnetic force developed in the coil of the magnetic circuit when the latter is energized.

This device has the disadvantage that due to the wide variation in electromagnetic forces produced by different magnetic coils and due to the small effective pressure area of the valve member on its seat, a wide and unacceptable range of pressure variations will exist between individual units which can lead to improper function under certain circumstances.

DE 44 30 723 (and corresponding U.S. application Ser. No. 08/521,592) show a control valve in which a branch line is present on the connection piece or channel on which the valve seat is arranged and a suction or pressure valve is disposed in the branch line to control flow in a by-pass channel.

SUMMARY OF THE INVENTION

An object of the invention, is to provide an electromagnetic control valve of the above type which is constructed to incorporate a pressure valve and a suction valve without any substantial increase in the space requirement of the control valve.

Another object of the invention is to provide such an electro-magnetic control valve having close tolerances for suction and overpresure relief.

In accordance with the invention, there is provided an electromagnetic control valve which comprises a coil housing, a valve housing having a connector for inlet thereinto of the medium whose pressure is to be controlled, said valve housing having a chamber connected to ambient atmosphere and a valve means controlling communication between said chamber and the medium introduced into said inlet. A by-pass channel is connected to ambient atmosphere and a suction valve controls communication between said by-pass channel and the medium introduced into said inlet. Said valve means comprises a valve plate facing a valve seat in the valve housing for selectively opening and closing an opening in said valve seat to respectively connect and disconnect the medium in the valve housing from said chamber. A basket slidably supports the valve plate and a spring is disposed between the basket and said valve plate to urge the valve plate against a stop means provided on the basket. An electromagnet is provided in said coil housing and includes an armature acting on said basket to displace the basket when said electromagnet is energized to apply said valve plate against said valve seat and cause said valve plate to be lifted off said stop means and be urged against said valve seat by said spring.

A further spring acts on the suction valve to close said by-pass channel with a determined force and the forces of the valve plate and the suction valve on their respective seats have a substantially constant difference.

The spring between the basket and the valve plate opposes positive pressure of the medium whereas, the further spring acting on the suction valve, opposes suction pressure of the medium.

BRIEF DESCRIPTION OF THE FIGURES OF THE DRAWING

FIG. 1 is a longitudinal section taken through one embodiment of the electromagnetic control valve of the invention.

FIG. 2 is a sectional view taken along line 2—2 in FIG. 1 showing, on enlarged scale, a portion of a basket and valve plate of the control valve.

DETAILED DESCRIPTION OF A PREFERRED EMBODIMENT

FIG. 1 of the drawing illustrates an electromagnetic control valve 1, which can be used, for example, for a venting device of a fuel tank of an internal combustion engine. The electromagnetic control valve 1 comprises a coil housing 2 and a valve housing 3. The valve housing 2 has a connector 4 for introducing the medium to be controlled into housing 3. The valve housing 3 has a valve seat 5 surrounding an opening which leads into a vent chamber 6 connected by a line (not shown) to a by-pass channel 7 connected to the ambient atmosphere 9. A suction valve 8 is interposed between the by-pass channel 7 and an inlet chamber 27 in the valve housing 3 which receives the medium from connector 4.

The coil housing 2 contains an electrical coil 10 having contact terminals 11, and a fixed armature yoke 12. An armature core 14 and a bearing 15 are fixed in coil housing 2 and cooperate with a magnetic armature 16 disposed within a central bore 13 of the coil housing such that the armature 16 undergoes axial travel in response to energization of the coil 10. The armature core 14 has an axial opening 17 which connects to the chamber 6 in valve housing 3.

In accordance with the invention, the valve seat 5 in valve housing 3 cooperates with a valve plate 18 which is slidably guided in a basket 19 and is acted on by a spring 20 to be urged against axial stop members 21 on basket 19. The basket 19 is radially and axially supported within chamber 6 and is engaged with a spring 22 acting in opposition to the magnetic armature 16, such that when the coil 10 is energized, the armature 16 displaces the basket 19 in the direction of valve seat 5 so that valve plate 18 engages against valve seat 5 and is lifted from the stop members 21 of basket 19.

The basket 19 comprises a base plate 23 of cylindrical disc shape from one side of which a plurality of integral, axial rods 24 extend in equal, circumferentially spaced relation. The rods 24 carry the stop members 21 at their distal ends against which the valve plate 18 is urged by spring 20. The rods 24 axially and radially guide the valve plate 18 and the spring 20 acting thereon. The base plate 23 has on its opposite side a stem 25 which projects through opening 17 into contact with armature 16 under the pressure of spring 22 which is connected between a wall 26 of chamber 6 and the outer edge of base plate 23.

The chamber 27 contains a valve plate 29 of suction valve 8 which cooperates with a valve seat of a bushing 28 surrounding the by-pass channel 7. The valve plate 29 is biassed by a spring 30 arranged inside chamber 27.

The outlet of bushing 28 leads to ambient atmosphere 9 and is protected against contamination by a removable cover 31 engaged on valve housing 3.

By reason of the construction of the valve of the invention, the valve plates 18 and 29 and their biassing springs 20 and 30 can be adapted as regards the area of their contact surfaces and the applied forces such that the valve plates will be displaced from their valve seats with a constant pre-determined pressure difference.

The size of the valve is kept small due to the space-saving arrangement in which the suction relief valve 8 is disposed cross-wise at right angles to the pressure relief valve.

Although the invention has been described in conjunction with a specific embodiment thereof, it will become apparent to those skilled in the art that numerous modifications and variations can be made within the scope and spirit of the invention as defined in the attached claims.

What is claimed is:

1. An electromagnetic control valve comprising a coil housing, a valve housing having a connector for inlet therein of a medium whose pressure which is to be controlled, said valve housing having a chamber connected to ambient atmosphere and a valve means controlling communication between said chamber and the medium introduced into said valve housing for opening when the medium exceeds a predetermined positive pressure, a by-pass channel connected to ambient atmosphere, and a suction valve controlling communication between said by-pass channel and the medium introduced into said valve housing when the medium is at a negative pressure which exceeds a predetermined negative pressure, said valve means comprising a valve plate facing a valve seat in said valve housing for selectively opening and closing an opening in said valve seat to respectively connect and disconnect the medium introduced into the valve housing from said chamber, a basket slidably supporting said valve plate, and a spring between said basket and said valve plate to urge the valve plate against a stop means provided on said basket, an electromagnet in said coil housing including an armature acting on said basket to displace the basket when said electromagnet is energized to apply said valve plate against said valve seat and cause said valve plate to be lifted off said stop means, said valve plate then being subject on one side thereof to which for positive pressures said medium tends to displace said valve plate off said seat and on the other side of said spring urging said valve plate against said seat whereby when said medium has a positive pressure above said predetermined value of positive pressure said valve plate will be forced off said seat to relieve said positive pressure, and when said medium has a negative pressure below said predetermined value of negative pressure said suction valve will open and the pressure will increase.

2. A control valve as claimed in claim 1, comprising a further spring acting on said suction valve to close said by-pass channel with a determined force.

3. A control valve as claimed in claim 2, wherein said spring between the basket and the valve plate and the further spring action on the suction valve are adapted relative to bearing areas of the valve plate and the suction valve against respective valve seats thereof to open at a predetermined pressure difference between said predetermined positive and negative pressure valves.

4. A control valve as claimed in claim 1, wherein said basket comprises a base plate and a plurality of rods extending from said base plate, said stop means comprising stop members on said rods, said valve plate being slidably guided by said rods.

5. A control valve as claimed in claim 4, wherein said base plate comprises a cylindrical disc and said rods extend axially from said base plate in circumferentially spaced relation, said stop members being disposed at distal ends of said rods.

6. A control valve as claimed in claim 5, comprising a biassing spring acting on said basket to oppose displacement thereof by said electromagnet.

7. A control valve as claimed in claim 6, wherein said spring acting on said valve plate is disposed between said valve plate and said base plate and is arranged within said circumferentially spaced rods.

8. A control valve as claimed in claim 7, comprising a stem extending from said base plate into engagement with said armature.

9. A control valve as claimed in claim 2, wherein said suction valve is supported in an inlet chamber in said valve housing, said valve means controlling communication between said inlet chamber and said chamber in the valve housing which is connected to ambient atmosphere, said suction valve including a valve plate which is movable in said inlet chamber to open and close communication between said inlet chamber and said by-pass channel, said valve plate of the suction valve being movable in a direction at right angles to the direction of movement of the valve plate of said valve means.

* * * * *